Feb. 18, 1936. E. B. BOUGHTON ET AL 2,030,848
BRAKE
Filed April 5, 1933
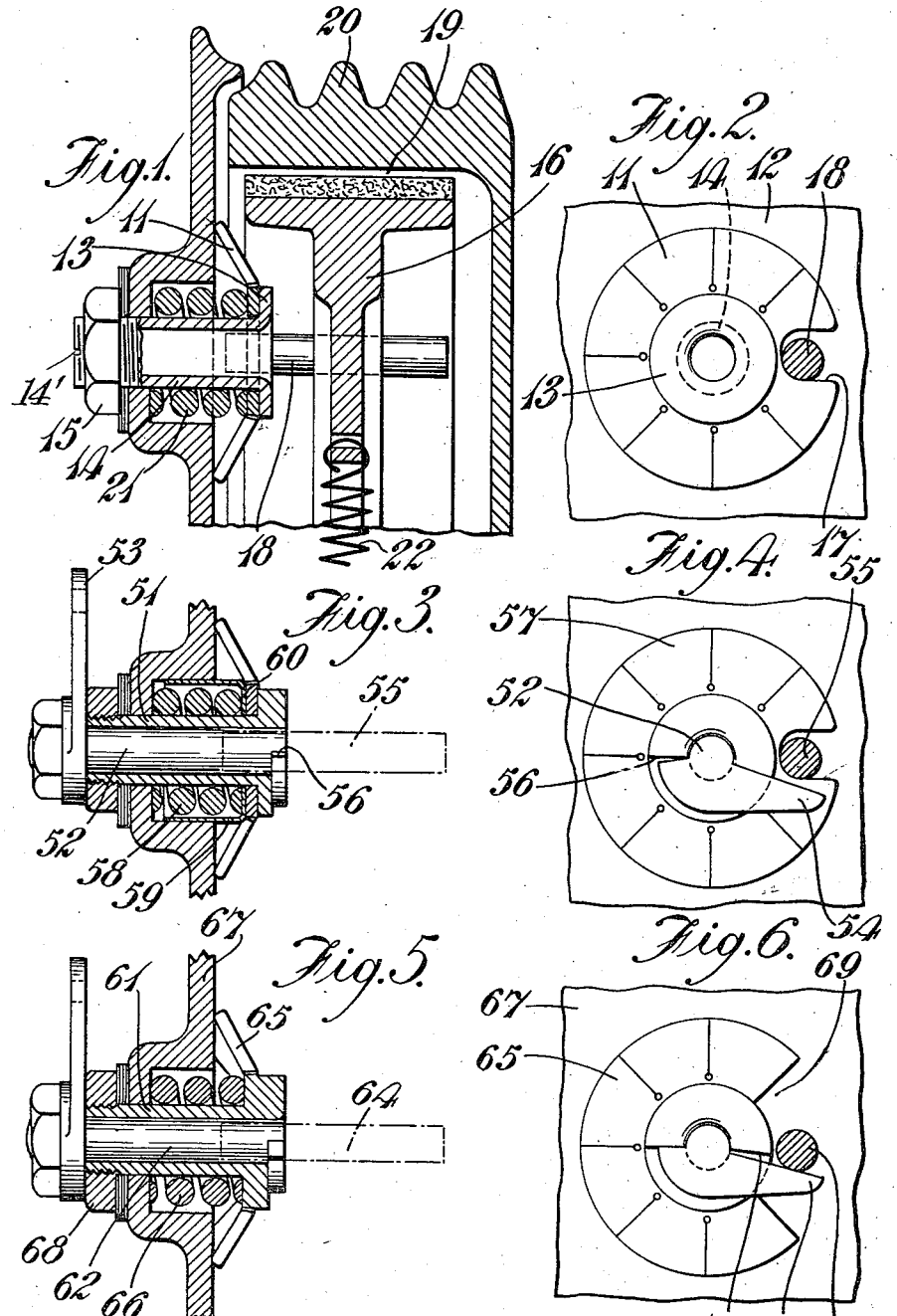
INVENTORS
E. B. BOUGHTON
G. VAN VESTRAUT Patented Feb. 18, 1936

2,030,848

UNITED STATES PATENT OFFICE 2,030,848

BRAKE

Edward Bishop Boughton, London, and Geoffrey Van Vestraut, Leamington Spa, England, assignors to Automotive Products Company Limited, London, England Application April 5, 1933, Serial No. 664,628
In Great Britain April 25, 1932

8 Claims. (Cl. 188—79.5)

This invention relates to brakes of the kind in which a shoe is movable into contact with a drum rotatable as one with a member the rotation of which is to be controlled. It is well known that for proper working it is necessary, as wear of the friction surfaces takes place to make such adjustments as will cause the brake shoe to assume, under the influence of its return spring when the brake is released, an "off" position which will be nearer the drum the greater the wear which has taken place. For the purpose of adjusting a brake in this way it has been proposed previously to mount a brake shoe locating member on a spindle so journalled frictionally on a fixed support, such as the usual brake shoe carrying plate, that it may be rotated manually to dispose and maintain the locating member at such a position in the path of a brake shoe away from the drum that said member will act as a stop to limit the extent to which the usual return spring may move the shoe away from the drum, and thus determine the "off clearance" between the shoe and drum. With such an arrangement, however, it is necessary to rotate the drum to determine the suitable clearance, and, in the case of a vehicle, to perform the irksome task of jacking up a running wheel, while the adjustment is being made, in order to be sure that the off clearance is set correctly, i. e. that when it is in its off position the shoe shall be clear of the drum.

The present invention has for an object to provide such improvements in brakes of the kind referred to as will enable the off clearance between the shoes and drum of a brake to be correctly set purely automatically by the application of the brake during use, and also, if desired, and without necessitating free rotation of the drum during the setting, render available at will the benefits of a smaller off clearance (and correspondingly reduced travel of the operating member, referred to hereinafter as a "pedal") than can conveniently be obtained automatically; or, alternatively, simply enable the off clearance to be set correctly by purely manual means without requiring free rotation of the drum.

According to the invention, a brake shoe locating member, mounted frictionally by spring pressure upon a fixed support to act as a stop limiting the extent to which a shoe can be moved away from the drum by the usual return spring, has lost motion connection between it and the brake shoe such that, upon movement of the shoe from its off position towards the drum through a distance greater than the desired off clearance, the locating member will be shifted correspondingly to a new position, thus reducing by a corresponding amount the distance through which the shoe can move away from the drum under the influence of the return spring.

The invention is illustrated by the accompanying diagrammatic drawing, of which:

Figure 1 is a fragmentary view showing one arrangement according to the invention in sectional elevation;

Figure 2 being a corresponding end view;

Figures 3 and 4 showing similarly a modified arrangement, and

Figures 5 and 6 showing in the same way yet another form of the invention.

The arrangement illustrated in Figures 1 and 2 of the drawing is purely automatic in its operation and, as shown therein, a brake shoe locating member in the form of a radially slotted resilient dished washer 11 is gripped between a brake shoe carrying plate 12 and a flange 13 at the inner end of a hollow primary spindle 14, extending through the plate 12, by means of a nut 15 on the outer end of said spindle 14 for adjusting the pressure to which the washer 11 is subjected and so determining the frictional resistance to rotation of said washer 11.

This automatic locating washer 11 is disposed upon the brake plate 12 at a point opposite to a brake shoe 16 (Figure 1) intermediately of the length of the latter, with a radial slot 17 (Figure 2) extending lengthwise of said shoe 16, and the latter carries a pin 18 which extends laterally therefrom into said slot 17. In this way the locating member 11 is coupled with the shoe 16 and, in order to provide the necessary lost motion in the coupling, the diameter of the brake shoe pin 18 is, as shown, less than the transverse dimension of the radial slot 17 in the locating member 11 by an amount corresponding with the clearance indicated at 19 (Figure 1) between the shoe 16 and an associated drum 20 (Figure 1) when said shoe 16 occupies the desired correct, automatic, off position.

In addition to the pressure with which the locating member 11 is brought to bear upon the brake plate 12, the pressure of a coiled compression spring 21 (see Figure 1) threaded over the primary spindle 14 between said member 11 and the plate 12 (which latter is recessed to receive it) serves to ensure frictional resistance to rotation of the primary spindle 14 and locating member 11, respectively, to the brake plate 12 and to one another.

In operation, when the brake shoe 16 is moved towards or away from the brake drum 20 by an amount greater than the extent of the lost motion, the locating member 11 will be rotated and the frictional grip between it and the brake plate 12 will be overcome. However, this friction between the brake plate 12 and the locating member 11 is greater than can be overcome by the brake shoe return spring, indicated at 22 (see Figure 1) so that, in the event of the locating member 11 being shifted during the application of the brake, the return movement of the shoe 16 when released will be limited by the extent of the lost motion between the brake shoe pin 18 and the locating member 11. The inter-relation of the friction between the locating member 11 and the primary spindle 14, the friction between said member 11 and the brake plate 12, and the strength of the brake shoe return spring 22, is such that, although the brake shoe 16 can be shifted away from the drum by rotating the spindle 14 itself, as by means of a screw-driven kerf 14' the spring 22 then assisting the friction between the spindle 14 and the locating member 11, rotation of said spindle 14 in the reverse direction cannot move the shoe 16 towards the drum 20, because the friction resisting corresponding movement of the locating member 11 is greater than the friction between said spindle 14 and said washer 11. The return spring 22 also acts to resist such movement of the locating member 11.

Thus, as wear of the brake lining takes place the off position of the shoe 16 itself will automatically be set nearer and nearer to the brake drum 20 so that the off clearance of the brake will remain substantially constant corresponding with the extent of the lost motion between the locating member 11 and the pin 18. It is also to be noted that manual drive of the spindle 14 cannot interfere with the setting but can only serve to withdraw the shoe 16 from the drum 20 as is desirable when the latter is to be removed.

It has been found that if this "automatic off clearance" be as small as is sometimes desirable the give and distortion caused by violent brake application may result in the shoes being set automatically to an off position in which the off clearance is not sufficient to ensure the shoes being properly clear of the drum. For this reason, it is necessary to provide an automatic off clearance larger than is otherwise necessary or desirable and thus a correspondingly large pedal travel will be required to bring the shoes to bear upon the drum. In order that the benefits of a smaller off clearance and reduced pedal travel may be available at will, a manual control may serve when operated to cause the shoe to assume immediately an off position nearer the drum than the automatic off clearance, without any necessity of rotating the drum, (and, in the case of a vehicle, jacking up a running wheel) to ensure that the shoes shall remain properly clear of the drum.

Where it is desired, in an arrangement such as that shown in Figures 1 and 2, to have available manually at will such a smaller off clearance the arrangement may be amplified as shown in Figures 3 and 4 of the drawing in which a hollow primary spindle 51 has extending therethrough a secondary spindle 52 rotatable manually through the medium of a lever 53 fast thereon to bring a projection 54 carried thereby into the path of a brake shoe pin 55, and there is lost motion connection, indicated at 56, between the primary and secondary spindles 51 and 52 less in effective extent than the lost motion between the automatic locating member and the brake shoe pin, here indicated at 57 and 55. Thus a reduced manual off clearance may be obtained when desired.

This reduced off clearance is obtained by rotating the secondary spindle 52, by means of the lever 53, in an anti-clockwise direction as viewed in Figure 4 until, as a result of the engagement of the projection 54 with the brake shoe pin 55, the shoe is brought into contact with the drum. There will, during this operation, be relative movement between the primary spindle 51 and the locating member 57, but when the secondary spindle 52 is released, the pull of the brake shoe spring 22 will cause the brake shoe pin 55 to shift the projection 54 and the secondary spindle 52 until the clearance indicated at 56 is taken up. There is now no direct cooperation between the brake pin 55 and the locating member 57, and the off clearance is now determined by the extent of the lost motion between the primary and secondary spindles 51 and 52 which is less than the normal direct lost motion between the locating member 57 and the brake shoe pin 55. It will be observed that during the reduced off clearance working, the primary spindle 51 and the secondary spindle 52 with its projection 54 are introduced virtually between the brake shoe pin 55 and the locking member 57, and that the effect of this is equivalent to what would be the effect of reducing the width of the slot in the locating member 57 in which the brake shoe 55 extends.

It will be observed, however, that movement of the secondary spindle 52 in the off direction, i. e. clockwise direction in Figure 4, will shift the locating member 57 correspondingly and so move the pin 55 and therefore the shoe away from the drum permitting easy removal of the latter.

Where manual adjustment only of a brake is required without the necessity for free rotation of the drum while the adjustment is effected, the arrangement may be similar to that shown in Figures 3 and 4 of the drawing and, in the example shown in Figures 5 and 6 of the drawing, a primary spindle 61 has extending therethrough a secondary spindle 62 identical with that shown at 52 in Figures 3 and 4 of the drawing, said secondary spindle having a projection, indicated at 63, for cooperating with a brake shoe pin 64. The primary spindle 61 is formed integrally with a dished flange 65 similar to the locating members 11 and 57 shown in Figures 1 to 4 and a coiled compression spring 66 is interposed between the head of the primary spindle 61 and the brake plate, here shown at 67, a nut 68 on the outer end of the hollow primary spindle 61 enabling the friction between the primary spindle and the brake plate to be adjusted; the flange 65 of the primary spindle 61 is cut away, as indicated at 69 (Figure 6), so that it in no way co-operates with the brake shoe pin 64. As indicated at 70, the lost motion connection between the primary spindle and the secondary spindle 61 and 62 is greater than that indicated at 56 in Figure 4 of the drawing between the primary and secondary spindles 51 and 52, this lost motion 70 corresponding in extent with the lost motion between the brake shoe pin 18 and the locating member 11 in Figure 2 of the drawing and that between the pin 55 and the locating member 57 shown in Figure 4 of the drawing.

In all cases such as those illustrated in the drawing for providing additional support at the inner end of a primary spindle such as 14, 51 or 61, the coiled compression spring may, as shown at 58 in Figure 3 of the drawing, be surrounded by a cylindrical casing 59 having an inturned flange 60 at its inner end within which the primary spindle 51 is a close fit.

In purely automatic arrangements such as that shown in Figure 1, the friction between the locating member and the primary spindle, the friction between said member and the brake plate or other fixed support, and the strength of the brake-shoe return spring are so interrelated that, although rotation of the spindle in one direction will move the shoe away from the drum, reverse rotation of the spindle will be ineffective and cannot move the shoe towards the drum. This particular arrangement is not essential, however, for the locating member may be keyed or otherwise made rotatable as one with the spindle, in which case the outer end of the spindle may be shaped in such manner, as for engagement with a "C-spanner" that, although it may easily be gripped and rotated to bring the shoe away from the drum, it cannot without a tool, such as a pipe wrench or the like, be rotated in the reverse direction to bring the shoe towards the drum.

In order that the operation of the construction described may be more easily understood, it will now be described with direct specific reference to the frictional resistance to movement of each part and the relations of such frictional resistance to movement necessary to carry out the operation.

In the first place, it has been stated that the frictional resistance between the disk 11 and the brake plate 12 is sufficient to overcome the pull of the brake shoe return spring 22 but that the frictional cooperation between the disk 11 and the manually operable spindle 14 is such that when the spindle is rotated in a direction to move the brake shoe through the medium of the disk 11 toward the drum, slip will take place between the spindle 14 and the disk 11 because the frictional grip between the spindle 14 and the disk 11 is less than that required to overcome the frictional grip between the disk 11 and the brake plate 12 plus the pull of the return spring 22. When, however, the spindle is rotated in the other direction, to move the brake shoe away from the drum, no slip takes place between the spindle 14 and the disk 11 because the frictional grip between the spindle and disk is now augmented by the pull of the return spring 22 and these together are greater than the frictional grip between the spindle 11 and the brake plate 12.

To simplify an understanding of the operation, it may be well to assign a numerical value to these respective forces. For example, we will assume that the frictional grip between the disk 11 and the brake plate 12 is represented by 25, the frictional grip between the spindle 14 and the disk 11 is represented by 20, and the pull of the brake spring 22 is represented by 10. Thus, the pull of the return spring 22 of the brake cannot overcome the frictional grip of the disk 11 with respect to the brake plate as 10 is less than 25. If the spindle is rotated in a direction to move the shoe by means of the disk toward the drum, the friction between the spindle 14 and the disk 11 cannot overcome the frictional grip between the disk 11 and the brake plate 12 plus the pull of the spring because the frictional grip between the spindle and disk is 20 while that of the disk 11 plus the pull of the spring is 35. If the spindle is rotated to move the brake shoe away from the drum, no slip takes place between the spindle and disk because the friction of the spindle with respect to the disk plus the pull of the spring, represented by 30, is greater than the frictional grip of the back plate represented by 25. Thus the operation previously described in connection with the construction shown in Figure 1 is entirely clear and understandable.

With respect to the showing in Figures 3 and 4, the exact relations of the relative frictional grips and the pull of the return spring of the brake are the same as described in connection with Figures 1 and 2. If the arm 54 is moved to reduce the off-clearance, it is apparent that the pull of the return spring 22 of the brake no longer influences the frictional grip between the disk 57 and the brake plate 12 and that the pull of this spring is transferred to the arm 54. The influence of the pull of the spring, indicated as 10, is, when the rod 55 bears against the arm, sufficient to cause the arm, by reason of the lost motion connection between it and the spindle, to bear upon the spindle which has a frictional grip represented by 20 and hence the pull of the spring 22 is insufficient to overcome the frictional grip of the spindle and the arm 54 is maintained in the position determined for the reduced off-clearance working.

In order to permit the arm, when adjustd for reduced off-clearance working, to move the spindle 51 without correspondingly moving the disk 57, the frictional grip between the spindle and disk must be less than that between the disk 57 and the brake plate, and as the frictional grip between the spindle and disk is indicated by 20 and the frictional grip between the disk 57 and the brake plate is indicated by 25, it is quite apparent that the object will be attained. Therefore, when the arm 54 is set in the reduced off-clearance working relation, the pull of the spring 22, which in this relation of the parts is borne directly by the arm, is insufficient to move the arm from the set position because any movement of the arm under the influence of the spring is resisted by the frictional grip of the spindle 51 which, as stated, is greater than that of the pull of the spring.

The above values being assigned to the frictional forces mentioned, it follows that, assuming the various parts to be in position for reduced off-clearance working, when the arm 54 is rotated by hand in a clockwise direction as viewed in Figure 4, it will move relatively to the disk 57, shifting with it the primary spindle 51 until the rod 55 contacts with the lower edge of the slot in the disk 57, and then, as the clockwise movement of the arm 54 is continued (and because, as is the case with the arrangement of Figures 1 and 2, the frictional grip between the spindle 51 and the disk 57 is greater, when augmented by the pull of the return spring, than the frictional grip between the disk 57 and the brake plate), the disk 57 will move with said arm 54 and the spindle 51.

It will be observed that the present invention not only provides in a simple and effective manner for the entirely automatic setting of a brake and for a closer manual setting to be available when desired, or, alternatively, for purely manual brake setting or adjustment with certainty of correct off clearance of the shoes, but also avoids all necessity of having a brake drum freely rotatable whilst the adjustment is made. In the case of a vehicle having brakes according to the invention, the manual adjustment can be effected without any jacking up of the running wheels or even when the vehicle is in motion.

In order that the benefits of the present invention may be utilized to the full, especially in the case of the brakes of a motor road vehicle, it is desirable that the means by which the brakes are applied should be arranged in any known or convenient manner so that the operating member or pedal shall always be capable of returning to its normal off position and also of imparting movement to the brake-shoe immediately it is moved from the said normal off position, independently of the actual setting, according to the present invention, of the off position of the brake shoe itself.

What we claim is:—

1. A brake of the internal expanding type, wherein the brake shoe is automatically operable to a position of non-braking cooperation with the drum, including a locating member formed with a slot, a pin having a diameter less than the width of the slot carried by the brake shoe and extending into said slot, said locating member being in the form of a disk frictionally held against external manual adjustment in one direction, with such frictional holding of the disk yielding to external manual adjustment in the opposite direction, and means for manually adjusting the locating member in the permissible direction.

2. A brake of the internal expanding type, wherein the brake shoe is automatically movable to a position of non-braking cooperation with the drum, including a locating member formed with a slot, a pin having a diameter less than the width of the slot carried by the brake shoe and extending into said slot, said locating member being in the form of a disk frictionally held against external manual adjustment in one direction, with such frictional holding of the disk yielding to external manual adjustment in the opposite direction, and means for manually adjusting the disk in the permissible direction, the frictional holding of the disk being overcome by the braking operation of the shoe to shift the disk to maintain the clearance substantially constant.

3. A brake of the internal expanding type, wherein the brake shoe is automatically operable to a position of non-braking cooperation with the drum, including a locating member formed with a slot, a pin having a diameter less than the width of the slot carried by the brake shoe and extending into said slot, said locating member being in the form of a disk frictionally restrained against external manual adjustment in one direction, with such frictional holding of the disk yielding to external manual adjustment in the opposite direction, the frictional holding of the disk being overcome by the braking operation of the shoe to adjust the clearance between the pin and slot wall to compensate for wear of the shoe while maintaining the clearance substantially constant, and a manually operable element carried by the disk to reduce the normal disk clearance at will.

4. A brake of the internal expanding type, wherein the brake shoe is automatically operable to a position of non-braking cooperation with the drum, including a locating member formed with a slot, a pin having a diameter less than the width of the slot carried by the brake shoe and extending into said slot, said locating member being in the form of a disk frictionally held against external manual adjustment in one direction, with such frictional holding of the disk yielding to external manual adjustment in the opposite direction, the frictional holding of the disk being overcome by the braking operation of the shoe to adjust the clearance between the pin and slot wall to compensate for wear of the shoe while maintaining the clearance substantially constant, and a manually operable element carried by the disk to reduce the normal disk clearance at will, said element being mounted for a predetermined free movement with respect to the disk and manually cooperative with the pin of the shoe to force the shoe into braking cooperation with the drum while correspondingly moving the disk to maintain the normal free movement between the disk and element, whereby to provide a clearance for the shoe coextensive with such free movement between the disk and element.

5. A locating member for use in connection with brakes of the internal expanding type, including a disk frictionally held against free movement, an element having limited free play with respect to the disk, a pin carried by the shoe, and means for manually adjusting the element into contact with the pin and thereafter moving the pin until the shoe has been brought into contact with the drum, the freedom of movement between the element and disk providing for reduced clearance between the shoe and drum.

6. A locating member for brakes of the internal expanding type, including a disk frictionally held against free movement, a manually movable element carried by the disk, said element being permitted a predetermined free movement with respect to the disk, a pin carried by the shoe and arranged in the path of movement of the element, said element in manual adjustment in one direction taking up relative freedom between the disk and element and moving until the shoe has been brought into contact with the drum, whereupon the element is permitted movement under the influence of the inoperative movement of the shoe to an extent determined by the freedom of movement between the element and disk.

7. A brake of the internal expanding type including a brake shoe, a return spring for the shoe, and means for moving the brake shoe automatically to a determined position of non-braking cooperation with the drum, including a locating member formed with a slot, a pin having a diameter less than the width of the slot, said pin being carried by the brake shoe and extending into the slot, the locating member being in the form of a disk frictionally held against external manual adjustment in one direction, with such frictional holding of the disk yielding to external manual adjustment in the opposite direction, the influence of the return spring relative to the frictional holding of the disk assisting to overcome such frictional holding in movement of the disk in permissible direction, the frictional holding of the disk being overcome by the braking movement of the shoe to shift the disk to maintain the clearance substantially constant.

8. A brake of the internal expanding type including a brake shoe, a return spring therefor, a locating disk formed with a slot, a pin having a diameter less than the width of the slot carried by the brake shoe and extending into said slot, said locating member being mounted for frictional resistance against external manual adjustment in a direction toward the drum, with such frictional resistance assisted by the resistance of the return spring, the locating member being manually adjustable in a direction from the drum with the frictional resistance in part overcome by the pull of the return spring, and means for manually adjusting the locating member in the permissible direction, the frictional holding of the disk in the opposite direction being automatically overcome in the braking operation of the brake shoe to shift the disk to maintain the clearance substantially constant.

EDWARD BISHOP BOUGHTON.
          GEOFFREY VAN VESTRAUT.